Sept. 4, 1923.  A. CHICHY  1,467,228
TIRE CHAIN FASTENER
Filed April 8, 1922   2 Sheets-Sheet 1
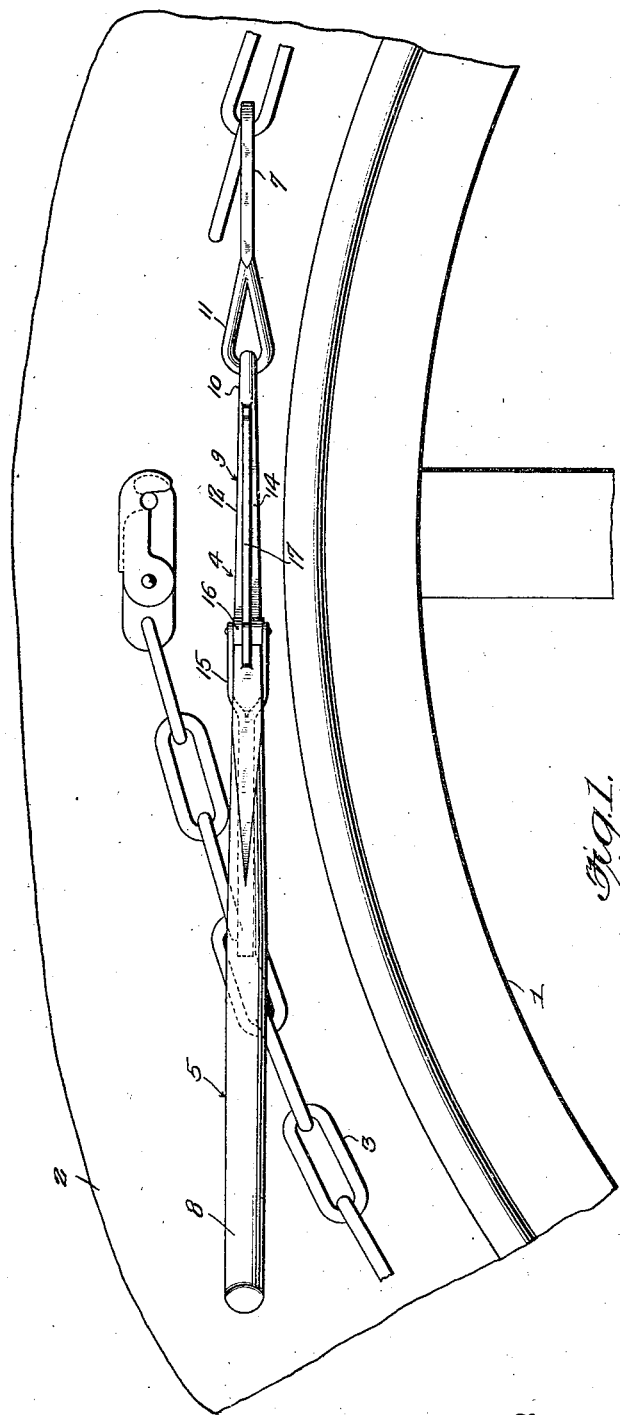
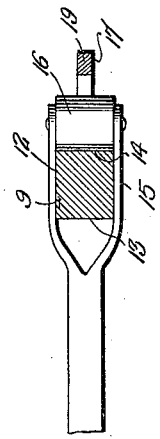
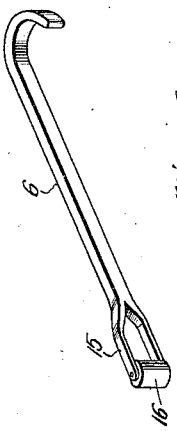
Inventor
August Chichy
By
John P. Dugan
Attorney Sept. 4, 1923.   A. CHICHY   1,467,228
TIRE CHAIN FASTENER
Filed April 8, 1922    2 Sheets-Sheet 2
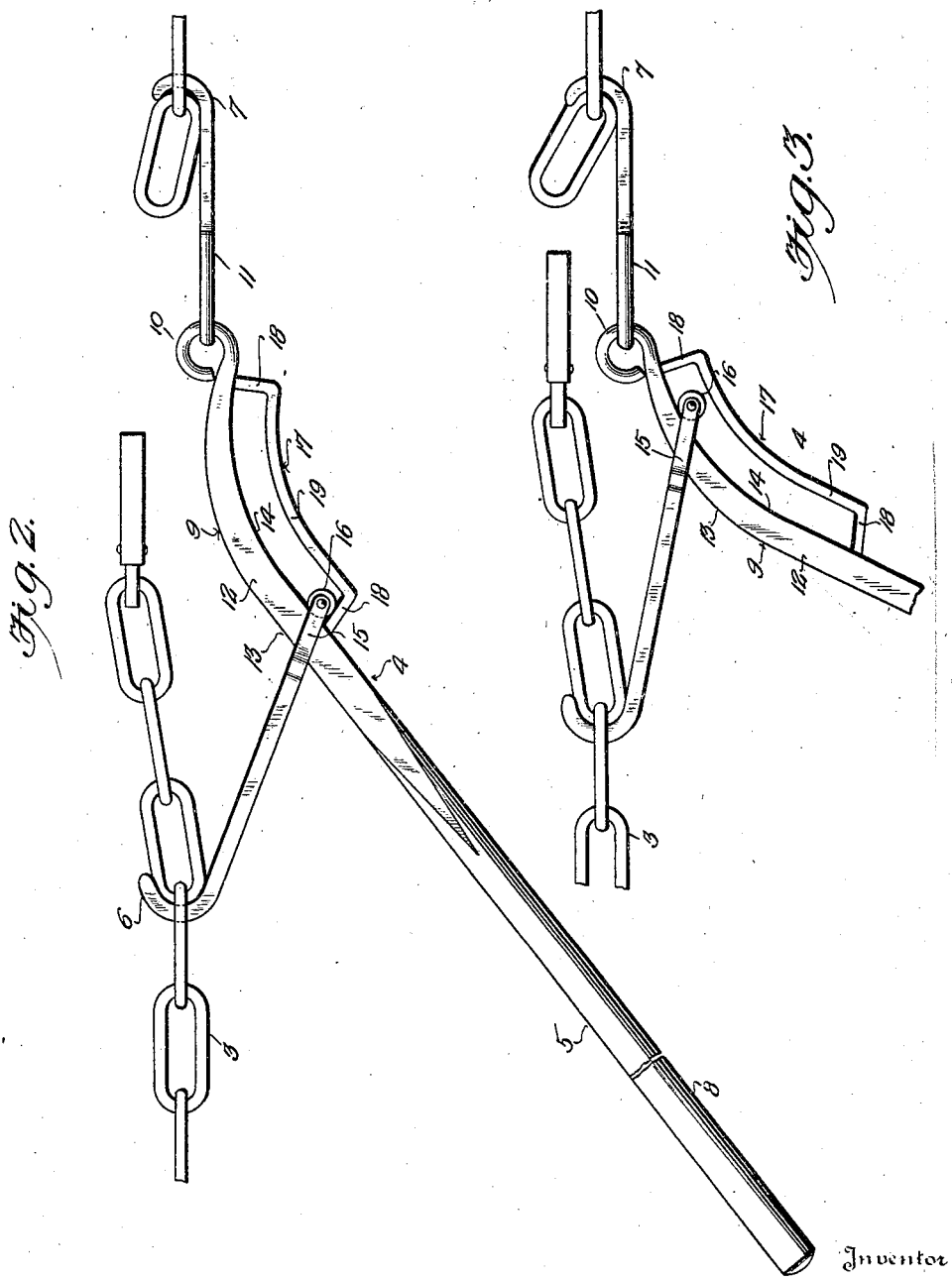
Inventor
August Chichy
By
John P. Dobbie
Attorney Patented Sept. 4, 1923.

1,467,228

UNITED STATES PATENT OFFICE.

AUGUST CHICHY, OF BAGLEY, MINNESOTA.

TIRE-CHAIN TIGHTENER.

Application filed April 8, 1922. Serial No. 550,678.

*To all whom it may concern:*

Be it known that I, AUGUST CHICHY, a citizen of the United States, residing at Bagley, in the county of Clearwater and State of Minnesota, have invented certain new and useful Improvements in Tire-Chain Tighteners, of which the following is a specification.

This invention relates to new and useful improvements in tire chain tighteners, and has for its object to provide a simple, economical and efficient tool of this character for use in tightening the anti-skid chains commonly used in connection with automobile tires.

With the foregoing and other objects in view that will readily appear as the nature of my invention is better understood, the same consists in the novel features of construction, combination and arrangement of parts illustrated in the drawings and more particularly pointed out in the appended claim.

In the accompanying drawings, which are for illustrative purposes only and are therefore not drawn to scale;—

Fig. 1 is front elevation of the device.

Fig. 2 is a side elevation.

Fig. 3 is a side elevation with the lever arm in its final position.

Fig. 4 is a detail view of the arm.

Fig. 5 is a detail view of the guide arm.

Referring to the drawings for a more particular description of my invention and in which drawings like parts are designated by like reference characters throughout the several views, the numeral 1 represents an automobile wheel of any ordinary or approved construction, 2 the pneumatic tire, 3 the tire chain and 4 my improved tire tool as a whole.

As shown in the drawings, this tool essentially comprises the handle or lever 5 and the tire chain hooks 6 and 7, respectively. The handle 5 preferably comprises a straight cylindrical outer portion 8 adapted to be grasped by the operator in tightening the tire chain and a longitudinally curved inwardly tapered inner portion 9 terminating at its extreme inner end in a hook 10 adapted to engage an eye 11 formed at the inner end of the hook 7. The inner portion of the handle 5 is formed with the flat sides 12 and the flat edges 13 and 14. The tire chain hook 6 is provided at its inner end with a fork or bifurcated portion 15 which straddles and works against opposite sides 12 of the inner portion 9 of the handle. This fork is provided with a bearing roller 16 which works against the curved edge 14 of the inner portion of the handle. The inner end of the handle is also provided with a substantially U-shape guide or keeper 17, the ends 18 of which are soldered or otherwise secured to the curved edge 14 and the body portion 19 of which is curved to correspond with the curvature of the inner portion 9 of the handle. This guide or keeper not only tends to keep the bearing roller in engagement with the curved edge 14 of the handle but limits the longitudinal play or movement of the roller and hook 6 in both directions. In practice, the hooks 6 and 7 are engaged with the ends of the tire chain and a pull exerted on the outer end of the handle or lever which draws the ends of the chain and hooks together and during which operation the bearing roller turns or works on the curved edge 14 of the lever towards the inner end thereof.

From the foregoing description taken in connection with the drawings, it is thought that the construction, operation and advantages of my invention will be readily understood without requiring a more extended explanation.

Having described my invention what I claim as new and desire to secure by Letters Patent, is:—

In a device of the character specified, a lever comprising a straight outer end portion forming a handle and a longitudinally curved inner portion formed with flat sides and flat oppositely disposed edges, a tire chain hook connected with the extreme inner end of said inner end portion, a second hook having a fork adapted to straddle and move longitudinally on the curved inner end portion of said lever, a bearing roller carried by said fork and working against the adjacent edge of said inner end portion of the lever and a guide or keeper secured at opposite ends to said edge of the inner end portion of the lever limiting the movement of the bearing roller and second tire chain hook in both directions.

In testimony whereof I affix my signature,

AUGUST CHICHY.